(12) United States Patent
Krishnan

(10) Patent No.: US 7,929,608 B2
(45) Date of Patent: Apr. 19, 2011

(54) METHOD OF REDUCING COMPUTATIONS IN INTRA-PREDICTION AND MODE DECISION PROCESSES IN A DIGITAL VIDEO ENCODER

(75) Inventor: Rathish Krishnan, Santa Clara, CA (US)

(73) Assignees: Sony Corporation, Tokyo (JP); Sony Electronics, Inc., Park Ridge, NY (US)

( * ) Notice: Subject to any disclaimer, the term of this patent is extended or adjusted under 35 U.S.C. 154(b) by 1422 days.

(21) Appl. No.: 11/391,801

(22) Filed: Mar. 28, 2006

(65) Prior Publication Data
US 2007/0237224 A1    Oct. 11, 2007

(51) Int. Cl.
*H04B 1/66* (2006.01)
(52) U.S. Cl. .......... 375/240.13; 375/240.12; 375/240.18
(58) Field of Classification Search . 375/240.12–240.18
See application file for complete search history.

(56) References Cited

U.S. PATENT DOCUMENTS

| | | | | |
|---|---|---|---|---|
| 5,594,812 A | 1/1997 | Boliek et al. | | 382/232 |
| 5,699,118 A | 12/1997 | Bolton | | 348/405 |
| 6,272,253 B1 | 8/2001 | Bannon et al. | | 382/236 |
| 6,614,847 B1 | 9/2003 | Das et al. | | 375/240.16 |
| 6,859,559 B2 | 2/2005 | Boon et al. | | 382/238 |
| 6,882,685 B2 | 4/2005 | Malvar | | 375/240.03 |
| 6,990,506 B2 | 1/2006 | Sun | | 708/402 |
| 2004/0264575 A1 | 12/2004 | Bjontegaard | | 375/240.18 |
| 2005/0013367 A1 | 1/2005 | Gallant et al. | | 375/240.16 |
| 2005/0058356 A1 | 3/2005 | Shen et al. | | 382/238 |
| 2005/0069211 A1 | 3/2005 | Lee et al. | | 382/239 |
| 2005/0207495 A1 | 9/2005 | Ramasastry et al. | | 375/240.16 |
| 2005/0244063 A1 | 11/2005 | Kwon et al. | | |
| 2005/0249277 A1* | 11/2005 | Ratakonda et al. | | 375/240.03 |
| 2005/0265454 A1 | 12/2005 | Muthukrishnan et al. | | 375/240.16 |
| 2005/0276330 A1* | 12/2005 | Park et al. | | 375/240.17 |
| 2005/0281337 A1 | 12/2005 | Kobayashi et al. | | 375/240.18 |
| 2006/0056719 A1* | 3/2006 | Yu et al. | | 382/239 |
| 2007/0206872 A1* | 9/2007 | Song | | 382/236 |

OTHER PUBLICATIONS

Ralf Schafer et al., The Emerging H.264/AVC Standard, Jan. 2003, p. 1-12, EBU Techincal Review.
Iain E G Richardson, H.264 / MPEG-4 Part 10 White Paper, Mar. 19, 2003, pp. 1-9, www.vcodex.com, Transform & Quantization.
Gary J. Sullivan et al., The H.264 / AVC Advanced Video Coding Standard: Overview and Introduction to the Fidelity Range Extensions, Aug. 2004, pp. 1-24.
Yeping Su et al., Efficient MPEG-2 to H.264/AVC Intra Transcoding in Transform-Domain, Dec. 2005, pp. 5, Mitsubishi Electric Research Laboratories http://www.merl.com.
Keng-Pang Lim et al., Text Description of Joint Model Reference Encoding Methods and Decoding Concealment Methods, Jan. 2005, pp. 1-43, Study of ITU-T Rec. H.264 and ITU-T Rec. H.2.64.2.

(Continued)

*Primary Examiner* — Curtis B Odom
(74) *Attorney, Agent, or Firm* — Haverstock & Owens LLP

(57) ABSTRACT

A method of improving the computation speed of the sum of absolute transformed distances (SATD) for different intra-prediction modes is described. Determining the SATD quicker provides the benefits of better coding performance without suffering the drawbacks of longer computation times. The method of reducing intra-prediction and mode decision processes in a video encoder, implements Hadamard transforms with improvements. Hadamard transforms are performed on an original block and predicted blocks and calculations are only performed where coefficients are non-zero thus skipping the coefficients that are zero. Using such an approach, the calculations required for the Vertical Prediction, Horizontal Prediction and DC Prediction are reduced significantly. Thus, the best intra-prediction mode is able to be determined very efficiently.

35 Claims, 6 Drawing Sheets

OTHER PUBLICATIONS

Antti Hallapuro et al., Low Complexity Transform and Quantization—Part I: Basic Implementation, Jan. 14, 2002, pp. 1-18, Nokia Corporation and Microsoft Corporation.

Keng-Pang Lim et al., Text Description of Joint Model Reference Encoding Methods and Decoding Concealment Methods, Jan. 2005, Study of ITU-T Rec. H.264 and ITU-T Rec. H.2.64.2.

Gary Sullivan et al., Draft of Version 4 of H.264/AVC (ITU-T Recommendation H.264 and ISO/IEC 14496-10 (MPEG-4 part 10) Advanced Video Coding), Nov. 11, 2004, pp. 1-315, Draft Third Edition of ITU-T Rec. H.264 (E).

H.264 / MPEG-4 Part 10 White Paper Revised Apr. 2003, pp. 1-6, www.vcodex.com H.264 / MPEG-4 Part 10: Intra Prediction.

* cited by examiner $V_0 = (v_0 + v_1 + v_2 + v_3) * 4$
$V_1 = (v_0 + v_1 - v_2 - v_3) * 4$
$V_2 = (v_0 - v_1 - v_2 + v_3) * 4$
$V_3 = (v_0 - v_1 + v_2 - v_3) * 4$

Fig. 4

METHOD OF REDUCING COMPUTATIONS IN INTRA-PREDICTION AND MODE DECISION PROCESSES IN A DIGITAL VIDEO ENCODER

FIELD OF THE INVENTION

The present invention relates to the field of video compression. More specifically, the present invention relates to reducing computations in intra-prediction and mode decision processes in digital video encoders.

BACKGROUND OF THE INVENTION

A video sequence consists of a number of pictures, usually called frames. Subsequent frames are very similar, thus containing a lot of redundancy from one frame to the next. Before being efficiently transmitted over a channel or stored in memory, video data is compressed to conserve both bandwidth and memory. The goal is to remove the redundancy to gain better compression ratios. A first video compression approach is to subtract a reference frame from a given frame to generate a relative difference. A compressed frame contains less information than the reference frame. The relative difference can be encoded at a lower bit-rate with the same quality. The decoder reconstructs the original frame by adding the relative difference to the reference frame.

A more sophisticated approach is to approximate the motion of the whole scene and the objects of a video sequence. The motion is described by parameters that are encoded in the bit-stream. Pixels of the predicted frame are approximated by appropriately translated pixels of the reference frame. This approach provides an improved predictive ability than a simple subtraction. However, the bit-rate occupied by the parameters of the motion model must not become too large.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

The intent of the H.264/AVC project was to develop a standard capable of providing good video quality at bit rates that are substantially lower than what previous standards would need (e.g. MPEG-2, H.263, or MPEG-4 Part 2). Furthermore, it was desired to make these improvements without such a large increase in complexity that the design is impractical to implement. An additional goal was to make these changes in a flexible way that would allow the standard to be applied to a wide variety of applications such that it could be used for both low and high bit rates and low and high resolution video. Another objective was that it would work well on a very wide variety of networks and systems.

H.264/AVC/MPEG-4 Part 10 contains many new features that allow it to compress video much more effectively than older standards and to provide more flexibility for application to a wide variety of network environments. Some key features include multi-picture motion compensation using previously-encoded pictures as references, variable block-size motion compensation (VBSMC) with block sizes as large as 16×16 and as small as 4×4, six-tap filtering for derivation of half-pel luma sample predictions, macroblock pair structure, quarter-pixel precision for motion compensation, weighted prediction, an in-loop deblocking filter, an exact-match integer 4×4 spatial block transform, a secondary Hadamard transform performed on "DC" coefficients of the primary spatial transform wherein the Hadamard transform is similar to a fast Fourier transform, spatial prediction from the edges of neighboring blocks for "intra" coding, context-adaptive binary arithmetic coding (CABAC), context-adaptive variable-length coding (CAVLC), a simple and highly-structured variable length coding (VLC) technique for many of the syntax elements not coded by CABAC or CAVLC, referred to as Exponential-Golomb coding, a network abstraction layer (NAL) definition, switching slices, flexible macroblock ordering, redundant slices (RS), supplemental enhancement information (SEI) and video usability information (VUI), auxiliary pictures, frame numbering and picture order count. These techniques, and several others, allow H.264 to perform significantly better than prior standards, and under more circumstances and in more environments. H.264 usually performs better than MPEG-2 video by obtaining the same quality at half of the bit rate or even less.

MPEG is used for the generic coding of moving pictures and associated audio and creates a compressed video bit-stream made up of a series of three types of encoded data frames. The three types of data frames are an intra frame (called an I-frame or I-picture), a bi-directional predicted frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame order. Such frames are usually predicted from two directions, for example from the I- or P-frames that immediately precede or the P-frame that immediately follows the predicted frame. These bidirectionally predicted frames are called B-frames.

There are many possible GOP structures. A common GOP structure is 15 frames long, and has the sequence I_BB_P_BB_P_BB_P_BB_P_BB_. A similar 12-frame sequence is also common. I-frames encode for spatial redundancy, P and B-frames for temporal redundancy. Because adjacent frames in a video stream are often well-correlated, P-frames and B-frames are only a small percentage of the size of I-frames. However, there is a trade-off between the size to which a frame can be compressed versus the processing time and resources required to encode such a compressed frame. The ratio of I, P and B-frames in the GOP structure is determined by the nature of the video stream and the bandwidth constraints on the output stream, although encoding time may also be an issue. This is particularly true in live transmission and in real-time environments with limited computing resources, as a stream containing many B-frames can take much longer to encode than an I-frame-only file.

B-frames and P-frames require fewer bits to store picture data, generally containing difference bits for the difference between the current frame and a previous frame, subsequent frame, or both. B-frames and P-frames are thus used to reduce redundancy information contained across frames. In operation, a decoder receives an encoded B-frame or encoded P-frame and uses a previous or subsequent frame to reconstruct the original frame. This process is much easier and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frames or B-frame is associated with an area in the previous or next image that it is well-correlated, as selected by the encoder using a "motion vector." The motion vector that maps the macroblock to its correlated area is encoded, and then the difference between the two areas is passed through the encoding process.

Conventional video codecs use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding, which is the approach used in the MPEG standards.

The output bit-rate of an MPEG encoder can be constant or variable, with the maximum bit-rate determined by the playback media. To achieve a constant bit-rate, the degree of quantization is iteratively altered to achieve the output bit-rate requirement. Increasing quantization leads to visible artifacts when the stream is decoded. The discontinuities at the edges of macroblocks become more visible as the bit-rate is reduced.

When the bit rate is fixed, the effective bit allocation can obtain better visual quality in video encoding. Conventionally, each frame is divided into foreground and background. More bits are typically allocated to the foreground objects and fewer bit are allocated to the background area based on the reasoning that viewers focus more on the foreground than the background. Such reasoning is based on the assumption that the viewer may not see the difference in the background if they do not focus on it. However, this is not always the case. Moreover, due to the characteristics of the H.264 standard, less bits in the background often leads to blurring, and the intra refresh phenomenon is very obvious when the background quality is low. The refresh in the static area, usually the background, annoys the human eye significantly and thus influences the visual quality.

To improve the quality of the background, a simple method allocates more bits to the background. This strategy will reduce the bits allocated to the foreground area, which is not an acceptable trade-off. Also, to make the fine details observable, the quantization scale needs to be reduced considerably, which means the bit-rate budget will be exceeded.

Another disadvantage is that the assumption of repetition of image sequence content is not true for most of the sequence. In most cases, the motion is mostly going along in one direction within several seconds. There is a limited match in previous frames for uncovered objects in the current frame. Unfortunately, state of the art long term motion prediction methods focus on the earlier frames as the reference.

An objective of the H.264 standard is to enable quality video at bit-rates that are substantially lower than what the previous standards would need. An additional objective is to provide this functionality in a flexible manner that allows the standard to be applied to a very wide variety of applications and to work well on a wide variety of networks and systems. Unfortunately, conventional encoders employing the MPEG standards tend to blur the fine texture details even in a relative high bit-rate. Also, the I-frame refresh is very obvious when the low bit-rate is used. As such, whenever an I-frame is displayed, the quality is much greater than the previous, non I-frames, which produces a discontinuity whenever the I-frame is displayed. Such a discontinuity is noticeable to the user. Although the MPEG video coding standard specifies a general coding methodology and syntax for the creation of a legitimate MPEG bit-stream, there are many opportunities left open to improve the quality of MPEG bit-streams.

In H.264/AVC intra coding, two intra macroblock modes are supported. They include the 4×4 intra-prediction mode and the 16×16 intra-prediction mode. If a sub-block or macroblock is encoded in intra mode, a prediction block is formed based on previously encoded and reconstructed blocks. The prediction block is subtracted from the current block prior to encoding. There are a total of 9 prediction modes for 4×4 luma blocks and 4 prediction modes for 16×16 luma blocks. The prediction mode that has the least distortion is chosen as the best mode for the block.

There are many methods to find the distortion, but the sum of absolute differences (SAD) or the sum of absolute transformed distances (SATD) are commonly used in low-complexity mode decision. Usually the coding performance by selecting SATD is 0.2-0.5 dB better, but computing the SATD is more time-consuming than finding the SAD.

Text Description of Joint Model Reference Encoding Methods and Decoding Concealment Methods, <http://ftp3.itu.ch/av-arch/jvt-site/2005_01_HongKong/JVT-N046r1.doc> (February 2005) discloses a method for concealing errors and losses in a decoder for video data conforming to the H.264 standard. The article discloses a method of calculating SATD, and an application of Hadamard transforms for computing SATD.

U.S. Patent Application No. 2005/0069211 to Lee et al. discloses a prediction method for calculating an average of intra-prediction costs or an average of inter-prediction costs of macroblocks of a received picture by encoding the received picture using an intra-prediction and/or inter-prediction in consideration of a type of the received picture, calculating a threshold value using the calculated average of intra-predication costs and/or inter-predication costs, and determining whether to perform intra-prediction on a subsequent picture based on the calculated threshold value. The amount of computations is reduced by reducing the number of macroblocks that undergo intra-prediction.

SUMMARY OF THE INVENTION

A method of improving the computation speed of the sum of absolute transformed distances (SATD) for different intra-prediction modes is described. Determining the SATD quicker provides the benefits of better coding performance without suffering the drawbacks of longer computation times. The method of reducing intra-prediction and mode decision processes in a video encoder, implements Hadamard transforms with improvements. Hadamard transforms are performed on an original block and predicted blocks and calculations are only performed where coefficients are non-zero thus skipping the coefficients that are zero. Using such an approach, the calculations required for the Vertical Prediction, Horizontal Prediction and DC Prediction are reduced significantly. Thus, the best intra-prediction mode is able to be determined very efficiently.

In one aspect, a method of reducing computations in intra-prediction and mode decision processes in video encoding processes, comprises calculating one or more absolute sums, calculating one or more Hadamard transforms and obtaining one or more sums of absolute transformed differences using the one or more absolute sums and the one or more Hadamard transforms. The one or more absolute sums include common transformed coefficients, coefficients for vertical prediction and coefficients for horizontal prediction. Calculating the one or more Hadamard transforms includes calculating a Hadamard transform for an original block. Calculating the one or more Hadamard transforms includes calculating a Hadamard transform for vertical prediction. Calculating the one or more Hadamard transforms includes calculating a Hadamard transform for horizontal prediction. Calculating the one or more Hadamard transforms includes calculating a Hadamard transform for DC prediction. The method further comprises reducing calculations by skipping the calculations with coefficients that are zero. Obtaining the one or more sums of absolute transformed differences is for vertical prediction, horizontal prediction, DC prediction and plane prediction. The method results in determining a best intra-prediction mode. The computations are reduced to less than 4000. The computations are reduced in a video encoder. The video encoder utilizes H.264 standard protocol.

In another aspect, a method of obtaining a sum of absolute transformed differences for low-complexity mode decision, comprises computing a first Hadamard transform of an original block, determining a first absolute sum of common transformed coefficients, determining a second absolute sum of coefficients for prediction, computing a second Hadamard transform of a predicted block, computing a difference between the first Hadamard transform and the second Hadamard transform, determining a third absolute sum of non-zero coefficients and obtaining the sum of absolute transformed differences by summing the first absolute sum, the second absolute sum and the third absolute sum. In some embodiments, prediction is vertical prediction. In some embodiments, prediction is horizontal prediction. In some embodiments, prediction is DC prediction. In some embodiments, predicted block is for vertical prediction. In some embodiments, predicted block is for horizontal prediction. In some embodiments, predicted block is for DC prediction. The method results in determining a best intra-prediction mode. The computations are reduced to less than 4000. The computations are reduced in a video encoder. The video encoder utilizes H.264 standard protocol.

In another aspect, a method of finding a best 16×16 intra-prediction mode in video encoding processes, comprises obtaining a first sum of absolute transformed differences for vertical prediction, obtaining a second sum of absolute transformed differences for horizontal prediction, obtaining a third sum of absolute transformed differences for DC prediction and obtaining a fourth sum of absolute transformed differences for plane prediction. The first sum of absolute transformed differences is obtained by summing an absolute sum of common transformed coefficients, an absolute sum of coefficients for the vertical prediction and an absolute sum of non-zero coefficients for the vertical prediction. The second sum of absolute transformed differences is obtained by summing an absolute sum of common transformed coefficients, an absolute sum of coefficients for the horizontal prediction and an absolute sum of non-zero coefficients for the horizontal prediction. The third sum of absolute transformed differences is obtained by summing an absolute sum of common transformed coefficients, an absolute sum of coefficients for the vertical prediction, an absolute sum of coefficients for the horizontal prediction and an absolute sum of non-zero coefficients for the DC prediction. The method further comprises reducing calculations by skipping the calculations with coefficients that are zero. The method results in determining a best intra-prediction mode. The computations are reduced to less than 4000. The computations are reduced in a video encoder. The video encoder utilizes H.264 standard protocol.

In yet another embodiment, an apparatus for reducing computations in intra-prediction and mode decision processes in video encoding processes, comprises a program module for calculating a plurality of absolute sums, calculating a plurality of Hadamard transforms and obtaining one or more sums of absolute transformed differences using the plurality of Hadamard transforms and a processor for executing the program module. The program module avoids computations where one or more coefficients are zero. The computations are reduced to less than 4000. The computations are reduced in a video encoder. The video encoder utilizes H.264 standard protocol.

In another embodiment, a video encoder comprises a component for intra-prediction, wherein the component for intra-prediction avoids computations where coefficients used are zero and an entropy coder coupled to the component for intra-prediction, wherein the entropy coder produces a plurality of compressed video bits. The component for intra-prediction calculates a plurality of absolute sums, calculates a plurality of Hadamard transforms and obtains one or more sums of absolute transformed differences using the plurality of Hadamard transforms. The computations are reduced to less than 4000. The video encoder utilizes H.264 standard protocol.

In yet another embodiment, a video capture and display device comprises a receiving unit for receiving video data, a display unit coupled to the receiving unit for displaying video data; and an encoder coupled to the receiving unit and the display unit for producing one or more compressed video bits, wherein the encoder avoids computations where one or more coefficients are zero in intra-prediction and mode decision processes. The computations are reduced to less than 4000. The encoder utilizes H.264 standard protocol.

BRIEF DESCRIPTION OF THE DRAWINGS

FIG. 4 illustrates a graphical representation of non-zero coefficients of the Vertical Prediction.

DETAILED DESCRIPTION OF THE PREFERRED EMBODIMENT

Figure 1:
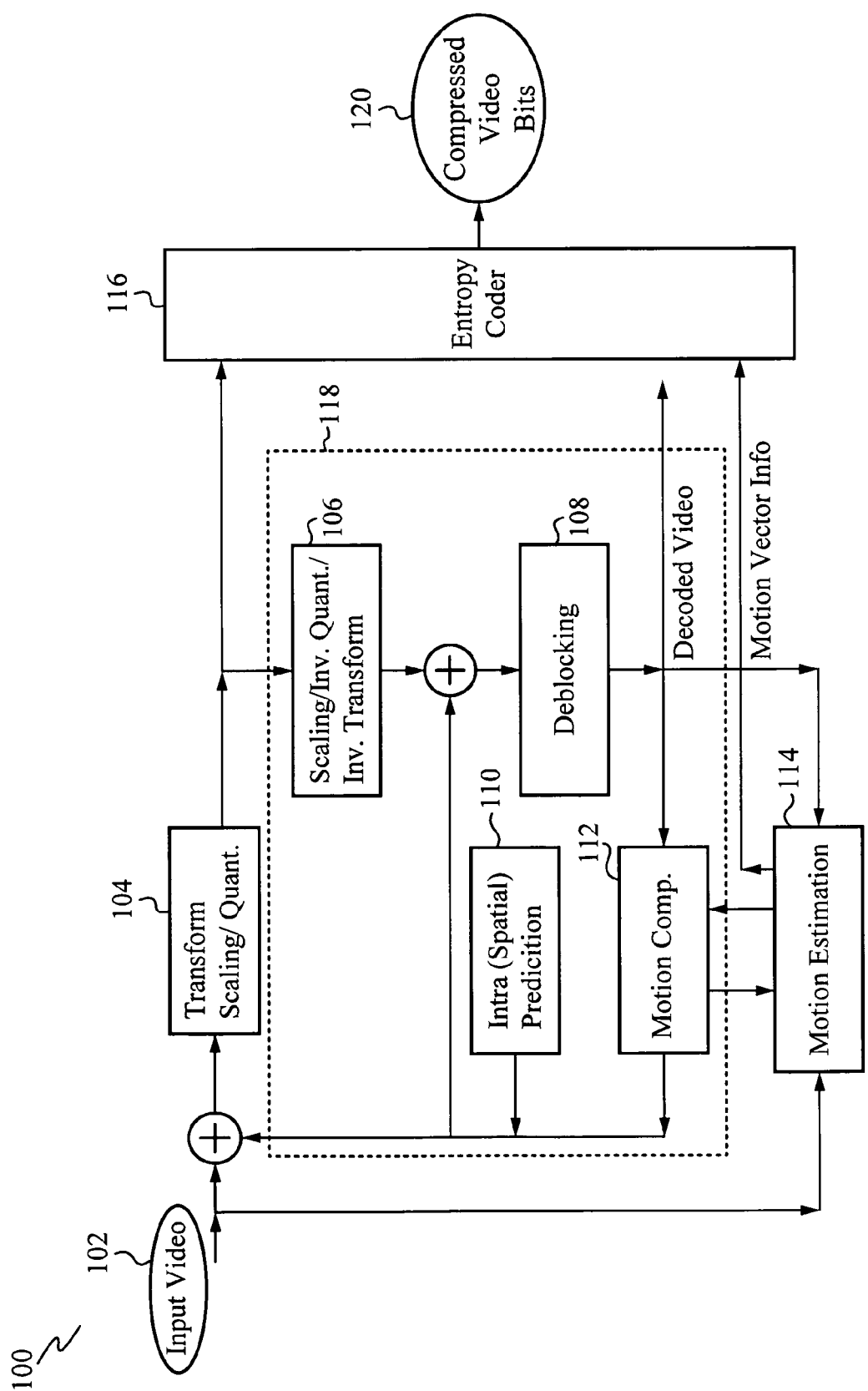
FIG. 1 illustrates a block diagram of the video coding layer of a macroblock.

FIG. 1 shows a block diagram of the video coding layer 100 of a macroblock. The video coding layer 100 (e.g. the encoder) includes a combination of temporal and spatial predictions along with transform coding. An input video 102 is received and split into a plurality of blocks. The first picture of a sequence is usually "intra" coded using only information contained within itself. Each part of a block in an intra frame is then predicted at the intra prediction module 110 using spatially neighboring samples of previously coded blocks. The encoding process chooses which neighboring samples are utilized for intra prediction and how they are used. This process is conducted at the decoder 118 as well as at the encoder 100. For the rest of the pictures of a sequence, usually "inter" coding is used. Inter coding implements motion compensation 112 from other previously decoded pictures. The encoding process for inter prediction/motion estimation 114 includes choosing motion data, determining the reference picture and a spatial displacement that is applied to all samples of the block. The motion data is transmitted as side information which is used by the encoder 100 and decoder 118.

The difference between the original and the predicted block is referred to as the residual of the prediction. The residual is transformed, and the transform coefficients are scaled and quantized at the transform and scaling quantization module 104. For the quantization of transform coefficients, scalar quantization is utilized. Each block is transformed using an integer transform, and the transform coefficients are quantized and transmitted using entropy-coding methods. An entropy encoder 116 uses a codeword set for all elements except the quantized transform coefficients. For the quantized transform coefficients, Context Adaptive Variable Length Coding (CAVLC) is utilized. The deblocking filter 108 is implemented to control the strength of the filtering to reduce the pixelation of the image.

The encoder 100 also contains the decoder 118 to conduct prediction for the next blocks. The quantized transform coefficients are inverse scaled and inverse transformed 106 in the same way as the encoder side which gives a decoded prediction residual. The decoded prediction residual is added to the prediction, and the combination is directed to the deblocking filter 108 which provides decoded video as output. Ultimately, the entropy coder 116 produces compressed video bits 120 of the originally input video 102.

A method of improving the computation speed of the sum of absolute transformed distances (SATD) for different intra-prediction modes is described. Determining the SATD quicker provides the benefits of better coding performance without suffering the drawbacks of longer computation times.

Figure 2:
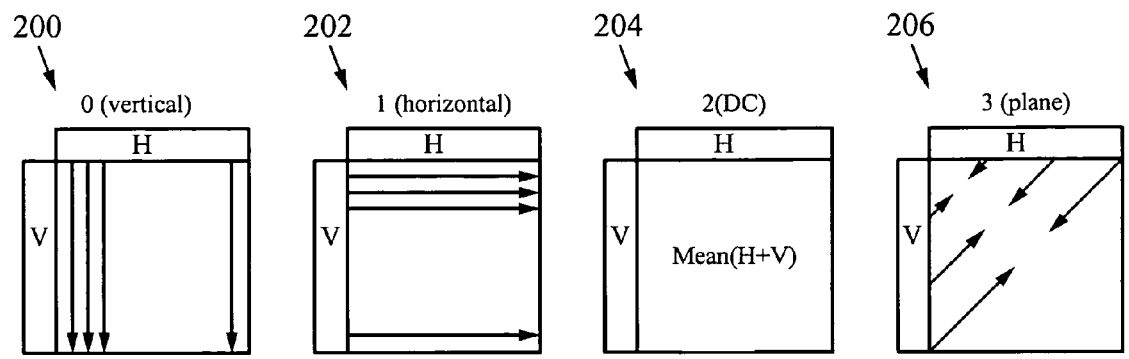
FIG. 2 illustrates four prediction modes for 16×16 luma blocks.

There are four prediction modes for 16×16 luma blocks. The prediction modes are illustrated in FIG. 2 and include:
1. Vertical Prediction 200: Extrapolation from upper samples (H)
2. Horizontal Prediction 202: Extrapolation from left samples (V)
3. DC Prediction 204: Mean of upper and left samples (H+V)
4. Plane Prediction 206: Linear function fitted to the upper and left samples f(H,V).

The common practice to find the SATD for each of the 4 intra-prediction modes involves subtracting the predicted macroblock from the current macroblock, followed by performing 4×4 Hadamard transformations on each of the sixteen sub-blocks and finally computing the sum of the absolute values of the transformed results. The first step of subtracting the predicted macroblock from the current macroblock involves 256 subtractions. Each 4×4 Hadamard transformation requires 32 additions and 32 subtractions. Therefore 16 such transformations requires 512 additions and 512 subtractions. The final step requires 256 absolute value computations and 255 additions. Table I below gives the details of the total computations required for each of the four predicted modes.

TABLE I

Total Computations for the Prediction Modes Without Reduction

| Prediction Mode | Additions | Subtractions | Abs Values | Shifts |
|---|---|---|---|---|
| Vertical | 767 | 768 | 256 | 0 |
| Horizontal | 767 | 768 | 256 | 0 |
| DC | 767 | 768 | 256 | 0 |
| Plane | 767 | 768 | 256 | 0 |
| Total | 3068 | 3072 | 1024 | 0 |

Thus, the previous method requires 3068 additions, 3072 subtractions and 1024 absolute value computations. However, the properties of Hadamard transforms are able to reduce the number of computations required to find the best 16×16 intra-prediction mode.

The distributive property of Hadamard transforms allows a reduction in the number of computations required to find the SATD for the Vertical, Horizontal and DC prediction modes. According to the distributive property, if O is the original 4×4 block, P is the predicted 4×4 block and H represents the Hadamard transform, then:

$$H\{O-P\}=H\{O\}-H\{P\}$$

Due to the repetition of coefficients in P, the transformed block H{P} is able to be computed using a very small number of computations for the Vertical, Horizontal and the DC prediction modes.

Figure 3A:
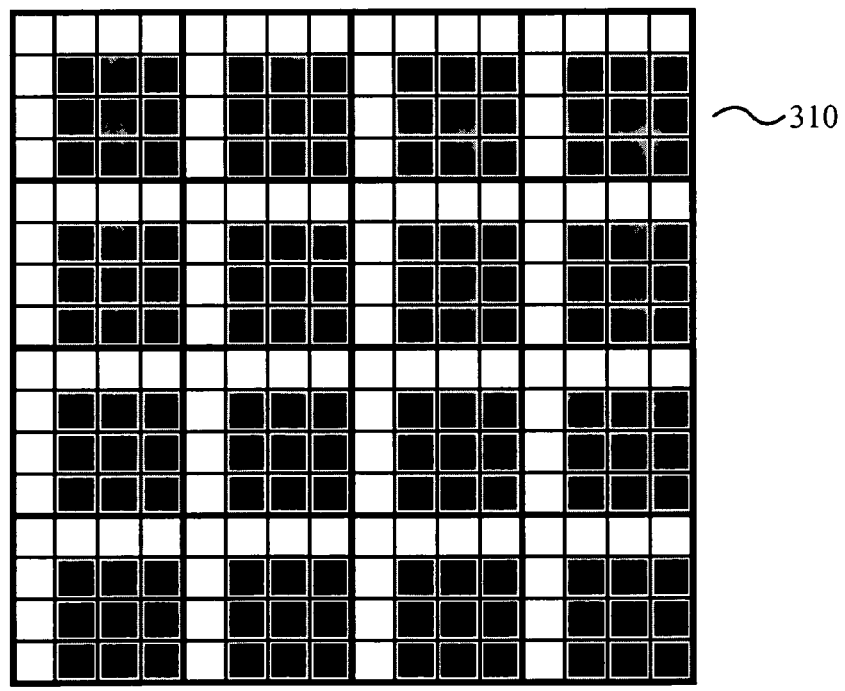
FIG. 3A illustrates a graphical representation of common coefficients.
Figure 3B:
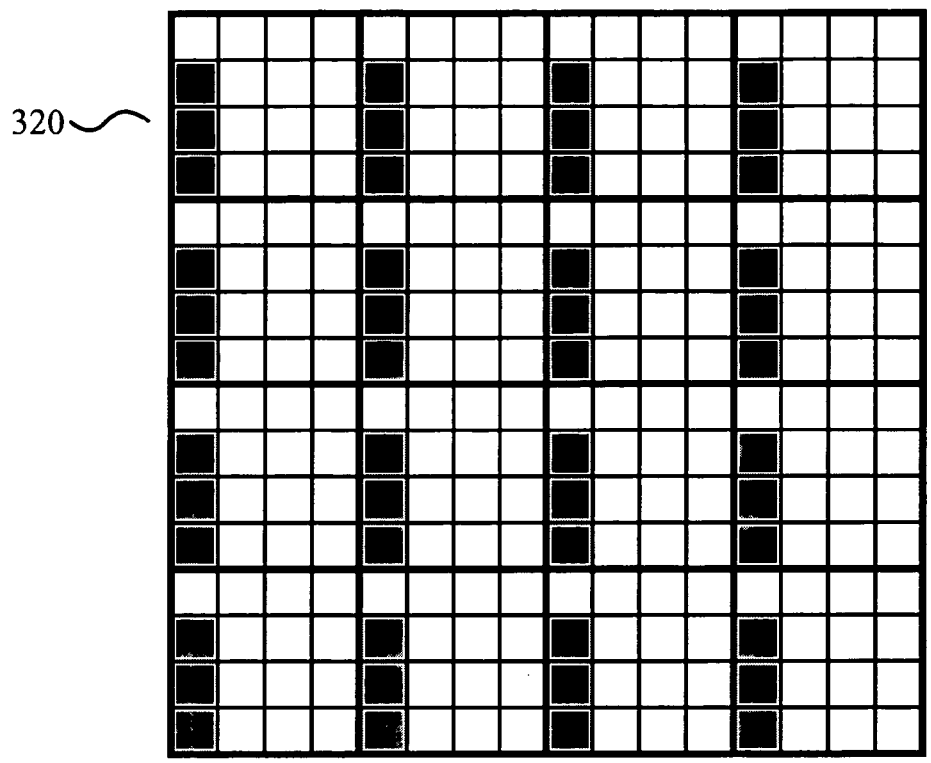
FIG. 3B illustrates a graphical representation of Vertical Prediction coefficients.
Figure 3C:
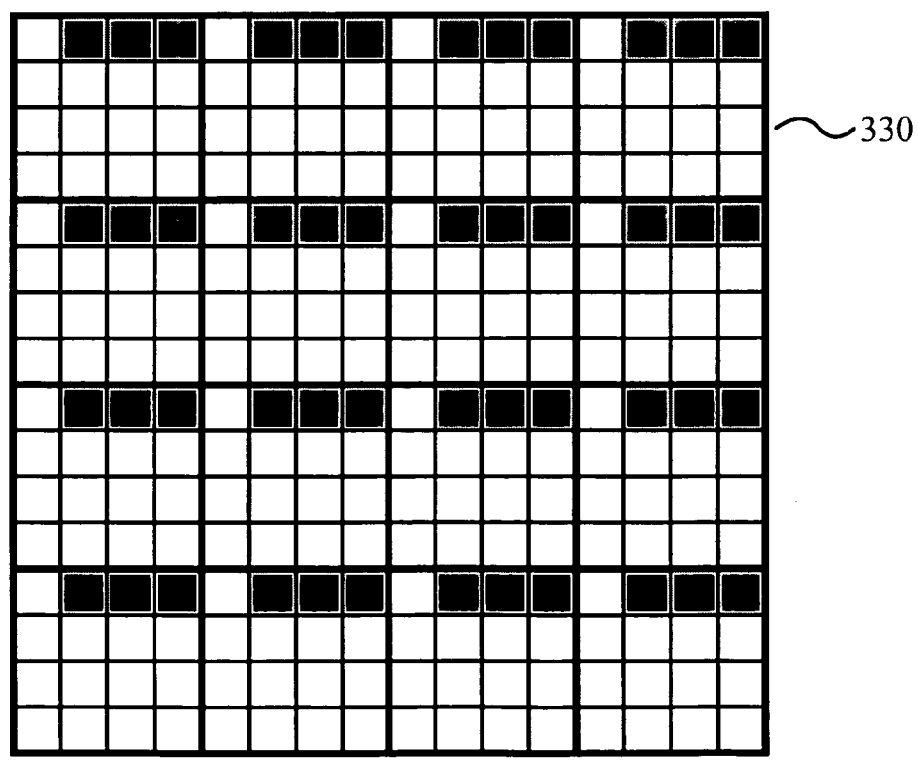
FIG. 3C illustrates a graphical representation of Horizontal Prediction coefficients.
Figure 4:
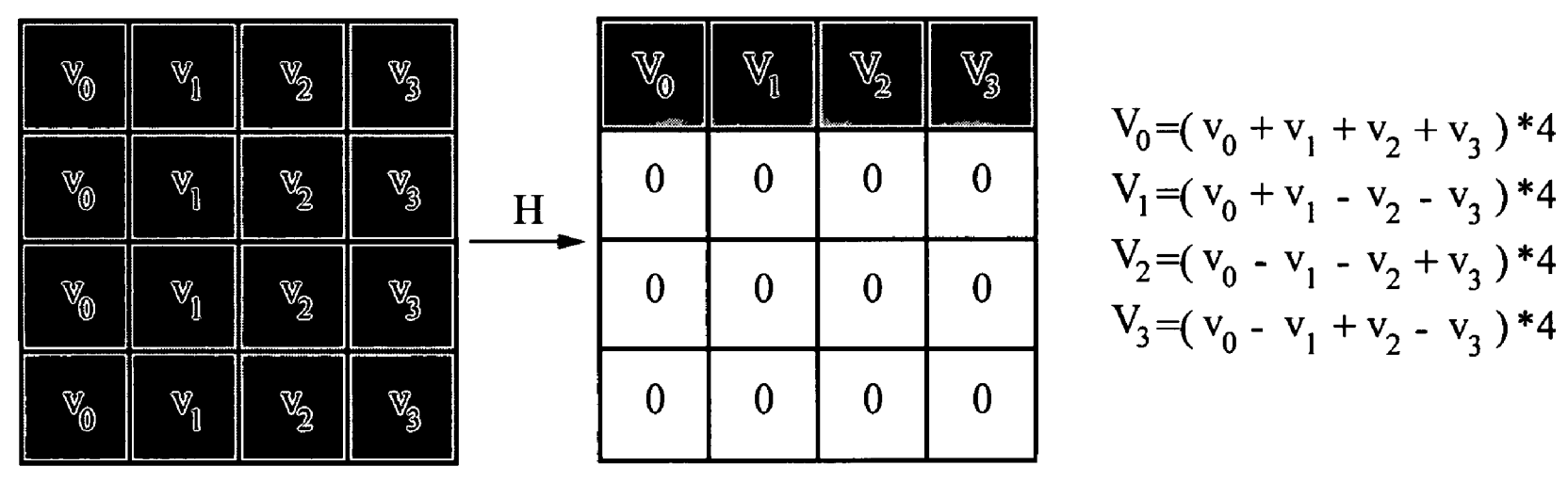

The first step in the improved method involves computing the value of H{O}. As mentioned above, computing H{O} requires 512 additions and 512 subtractions. The next step is to find the absolute sum of the common transformed coefficients. The common coefficients are shown by shaded blocks 310 in FIG. 3A. The absolute sum of the common coefficients requires 144 absolute value computations and 143 additions. The absolute sum of the common coefficients is represented by $A_c$. The next step is finding the absolute sum of coefficients that are utilized for Vertical Prediction. The coefficients for Vertical Prediction are shown as shaded blocks 320 in FIG. 3B. The absolute sum of Vertical Prediction coefficients can be represented by $A_v$. The calculation of $A_v$ requires 48 absolute value computations and 47 additions. $A_h$ is then determined, which represents the absolute sum of coefficients that are required for Horizontal Prediction. The Horizontal Prediction coefficients are shown as shaded blocks 330 in FIG. 3C. As was needed for $A_v$, 48 absolute value computations and 47 additions are needed to find $A_h$. The next step involves finding H{P} for Vertical Prediction. Due to the repetition of coefficients in P, the Hadamard transform of each 4×4 block of P yields only a maximum of four non-zero coefficients as seen in FIG. 4. The four non-zero coefficients require 4 additions, 4 subtractions and 4 shifts. Since P only contains a maximum of 16 different coefficients, computing H{P} for the entire 16×16 block requires 16 additions, 16 subtractions and 16 shifts. The next step is the computation of H{O}−H{P} for the non-zero coefficients which requires 64 subtractions. The absolute sum of the coefficients ($H_v$) requires 64 absolute value computations and 63 additions. The final SATD for the Vertical Prediction is given by the sum of $H_v$, $A_v$ and $A_c$ which requires 2 more additions.

Figure 5:
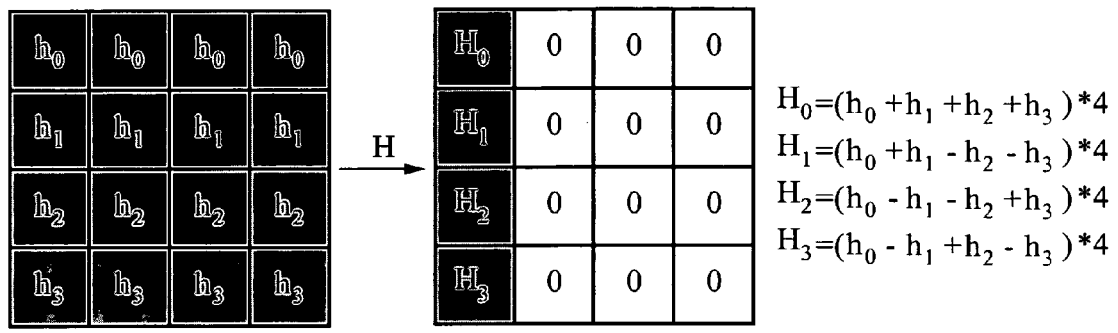
FIG. 5 illustrates a graphical representation of non-zero coefficients of the Horizontal Prediction.

The Horizontal Prediction follows a similar pattern. H{P} for the Horizontal Prediction has to be computed. The non-zero coefficients of the Horizontal Prediction are as shown in FIG. 5. After computing H{O}−H{P} for the 64 non-zero coefficients, the absolute sum of the non-zero coefficients ($H_h$) must be found. The final SATD for the Horizontal Prediction is given by the sum of $H_h$, $A_h$ and $A_c$ which requires 2 more additions.

Figure 6:
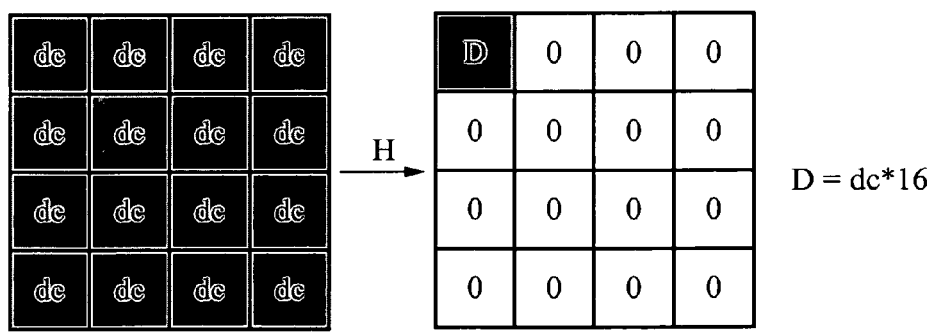
FIG. 6 illustrates a graphical representation of non-zero coefficients of the DC Prediction.

For the DC Prediction, fewer computations are required. For each 4×4 block in DC prediction, only 1 non-zero coefficient is produced as is shown in FIG. 6. As a result, computing H{P} for DC Prediction requires only 1 shift instruction. Computing H{O−P} for the entire 16×16 block requires 16 subtractions, and the absolute sum of these coefficients ($H_d$) requires 16 absolute value computations and 15 additions. The final SATD for DC Prediction is given by $H_d$, $A_v$, $A_h$ and $A_c$ which requires 3 more additions.

Since Plane Prediction usually does not contain repetition of coefficients, computing the SATD for this mode requires the same number of computations as in the current techniques, which is 767 additions, 768 subtractions and 256 absolute value computations.

Table II below gives a summary of the total computations required in the method described herein.

TABLE II

Total Computations for the Prediction Modes With Reduction

| Task | Additions | Subtractions | Abs Values | Shifts |
|---|---|---|---|---|
| H{O} | 512 | 512 | 0 | 0 |
| Ac | 143 | 0 | 144 | 0 |
| Av | 47 | 0 | 48 | 0 |
| Ah | 47 | 0 | 48 | 0 |
| Vertical | 81 | 80 | 64 | 16 |
| Horizontal | 81 | 80 | 64 | 16 |
| DC | 18 | 16 | 16 | 1 |
| Plane | 767 | 768 | 256 | 0 |
| Total | 1696 | 1456 | 640 | 33 |

Therefore, the total additions and subtractions for the method described herein are reduced to 3152 from 6140. The reduction in the number of additions and subtractions is about 50%. The number of absolute value computations is reduced from 1024 to 640, which is about a 40% reduction. The overhead is the introduction of only 33 shift instructions. Thus, the method significantly reduces the number of computations required for finding the best 16×16 intra-prediction mode. The method is also usable for reducing the computations required to find the best 4×4 intra-prediction mode.

Figure 7:
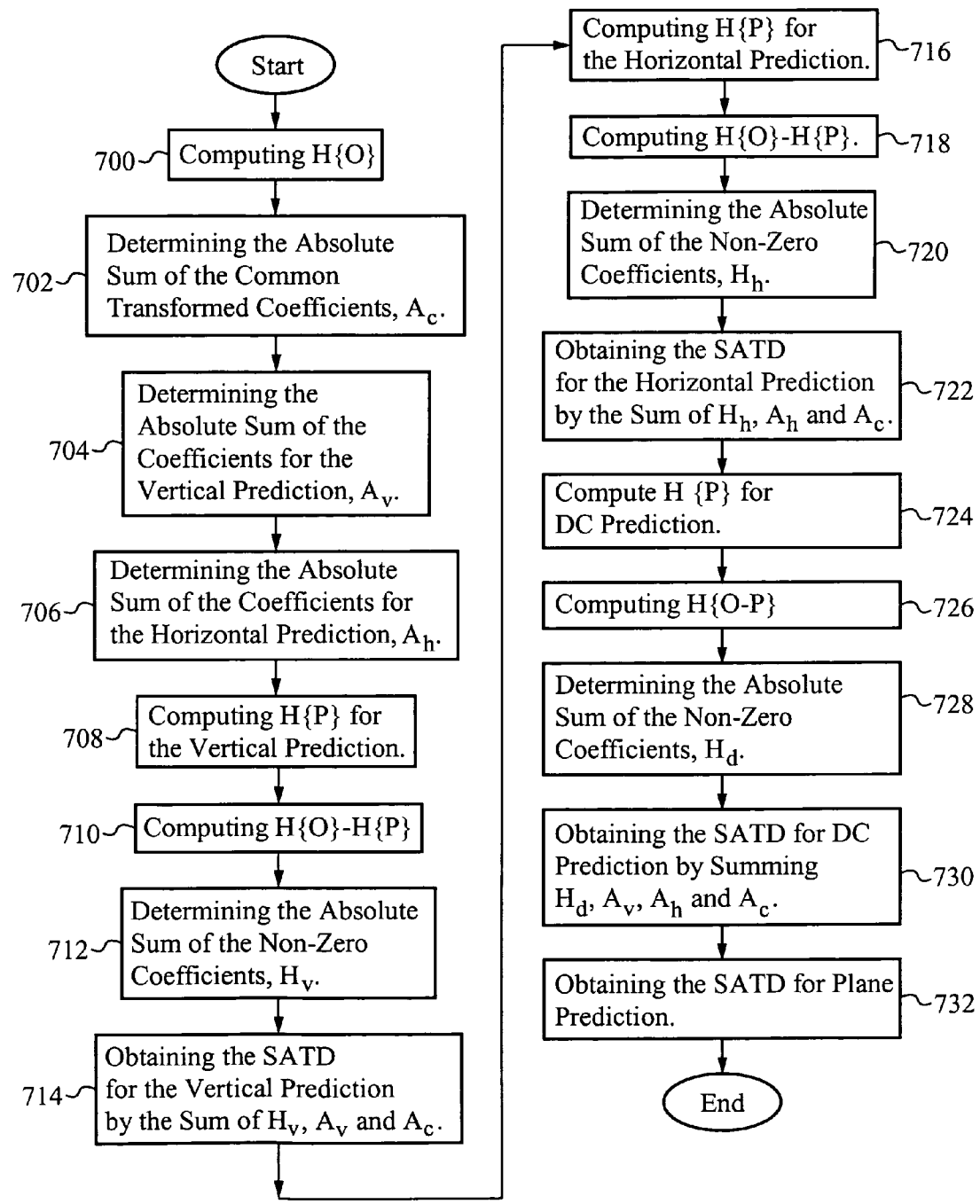
FIG. 7 illustrates a flow chart of a method of reducing the number of computations.

FIG. 7 illustrates a flow chart of the method described herein. At the step 700, the Hadamard transform of the original block, H{O}, is computed. At the step 702, the absolute sum of the common transformed coefficients $A_c$ is determined. At the step 704, the absolute sum of coefficients that are utilized for Vertical Prediction $A_v$ is determined. At the step 706, the absolute sum of coefficients that are required for Horizontal Prediction $A_h$ is determined. At the step 708, the Hadamard transform of the predicted block, H{P}, for Vertical Prediction is found. At the step 710, the difference between Hadamard transforms, H{O}−H{P}, is computed for the non-zero coefficients. At the step 712, the absolute sum of the non-zero coefficients for the Vertical Prediction, $H_v$, is found. At the step 714, the SATD for the Vertical Prediction is achieved by summing the absolute sum of the non-zero coefficients for the Vertical Prediction $H_v$, the absolute sum of the coefficients for Vertical Prediction $A_v$ and the absolute sum of the common transformed coefficients $A_c$. At the step 716, the Hadamard transform, H{P}, for Horizontal Prediction is found. At the step 718, the difference between Hadamard transforms, H{O}−H{P}, is computed for the non-zero coefficients. At the step 720, the absolute sum of the non-zero coefficients for the Horizontal Prediction $H_h$ is found. At the step 722, the SATD for the Horizontal Prediction is achieved by summing the absolute sum of the non-zero coefficients for the Horizontal Prediction $H_h$, the absolute sum of the coefficients for Horizontal Prediction $A_h$ and the absolute sum of the common transformed coefficients $A_c$. At the step 724, the Hadamard transform, H{P}, for DC Prediction is found. At the step 726, the Hadamard transform, H{O−P}, is computed for the non-zero coefficients. At the step 728, the absolute sum of the non-zero coefficients for the DC Prediction $H_d$ is found. At the step 730, the SATD for DC prediction is achieved by summing the absolute sum of the non-zero coefficients for the DC Prediction $H_d$, the absolute sum of the coefficients for Vertical Prediction $A_v$, the absolute sum of the coefficients for Horizontal Prediction $A_h$ and the absolute sum of the common transformed coefficients $A_c$. At the step 732, the SATD for Plane Prediction is computed. Thus, the best intra-prediction mode is found.

To utilize the method of reducing intra-prediction and mode decision processes in an H.264 encoder, Hadamard transforms are implemented with improvements. Initially, the Hadamard transform of an original block is computed. Then, the absolute sums of the common transformed coefficients, the vertical prediction coefficients and the horizontal prediction coefficients are determined. The Hadamard transforms for the Vertical Prediction, Horizontal Prediction and DC Prediction are then computed. The absolute sum of the non-zero coefficients for the Vertical Prediction, Horizontal Prediction and DC Prediction are also calculated. Then, using the previously calculated data, SATDs for each of the prediction modes are obtained. Once the SATDs are calculated for Vertical Prediction, Horizontal Prediction and DC Prediction, the SATD is obtained for plane prediction. Using all four prediction modes, the best intra-prediction mode is able to be determined.

In operation, the method of reducing computations in the intra-prediction and mode decision processes is able to decrease the required time and computation power of an H.264 encoder. An aspect of the coding process includes intra-prediction and mode decision. These aspects of the coding process are greatly reduced by implementing the method of computing a plurality of absolute sums, computing a plurality of Hadamard transforms and obtaining a sum of absolute transformed differences. Instead of a large number of computations, the method described herein is able to utilize the transforms to minimize the number of computations required. Specifically, since a number of coefficients in the predicted block repeat, the Hadamard transform of the predicted block is able to be computed with a small amount of computations for the Vertical, Horizontal and DC Prediction modes.

The method described herein is able to be implemented with/on devices including, but not limited to, laptops, personal computers, servers, cell phones, PDAs, video-iPods, DVD recorders, DVDs, digital cameras/camcorders, video game consoles, portable video game players, security such as video surveillance, high definition television broadcast, video phones, videoconferencing, video streaming over the internet and other multimedia applications.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of reducing computations in intra-prediction and mode decision processes in video encoding processes programmed in a controller in a device, comprising:
   a. calculating, in the device, a first absolute sum of common transform coefficients,
   b. calculating one or more Hadamard transforms; and
   c. obtaining one or more sums of absolute transformed differences using the first, second and third absolute sums and the one or more Hadamard transforms.

2. The method as claimed in claim 1 wherein calculating the one or more Hadamard transforms includes calculating a Hadamard transform for an original block.

3. The method as claimed in claim 1 wherein calculating the one or more Hadamard transforms includes calculating a Hadamard transform for vertical prediction.

4. The method as claimed in claim 1 wherein calculating the one or more Hadamard transforms includes calculating a Hadamard transform for horizontal prediction.

5. The method as claimed in claim 1 wherein calculating the one or more Hadamard transforms includes calculating a Hadamard transform for DC prediction.

6. The method as claimed in claim 1 further comprising reducing calculations by skipping the calculations with coefficients that are zero.

7. The method as claimed in claim 1 wherein obtaining the one or more sums of absolute transformed differences is for vertical prediction, horizontal prediction, DC prediction and plane prediction.

8. The method as claimed in claim 1 wherein the method results in determining a best intra-prediction mode.

9. The method as claimed in claim 1 wherein computations are reduced to less than 4000.

10. The method as claimed in claim 1 wherein the computations are reduced in a video encoder.

11. The method as claimed in claim 10 wherein the video encoder utilizes H.264 standard protocol.

12. A method of obtaining a sum of absolute transformed differences for low-complexity mode decision programmed in a controller in a device, comprising:
   a. computing, in the device, a first Hadamard transform of an original block;
   b. determining a first absolute sum of common transformed coefficients;
   c. determining a second absolute sum of coefficients for prediction;
   d. computing a second Hadamard transform of a predicted block;
   e. computing a difference between the first Hadamard transform and the second Hadamard transform;
   f. determining a third absolute sum of non-zero coefficients; and
   g. obtaining the sum of absolute transformed differences by summing the first absolute sum, the second absolute sum and the third absolute sum.

13. The method as claimed in claim 12 wherein the prediction is vertical prediction.

14. The method as claimed in claim 12 wherein the prediction is horizontal prediction.

15. The method as claimed in claim 12 wherein the prediction is DC prediction.

16. The method as claimed in claim 12 wherein the predicted block is for vertical prediction.

17. The method as claimed in claim 12 wherein the predicted block is for horizontal prediction.

18. The method as claimed in claim 12 wherein the predicted block is for DC prediction.

19. The method as claimed in claim 12 wherein the method results in determining a best intra-prediction mode.

20. The method as claimed in claim 12 wherein computations for low-complexity mode decision are reduced to less than 4000.

21. The method as claimed in claim 20 wherein the computations are reduced in a video encoder.

22. The method as claimed in claim 21 wherein the video encoder utilizes H.264 standard protocol.

23. A method of finding a best intra-prediction mode in video encoding processes programmed in a controller in a device, comprising:
   a. calculating, in the devive, a first absolute sum of common transform coefficients,
   b. obtaining a second sum of absolute transformed differences for horizontal prediction;
   c. obtaining a third sum of absolute transformed differences for DC prediction, and
   d. obtaining a fourth sum of absolute transformed differences for plane prediction, and
   e. selecting the best intra-prediction mode from the vertical prediction, horizontal prediction, DC prediction and plane prediction.

24. The method as claimed in claim 23 wherein the second sum of absolute transformed differences is obtained by summing an absolute sum of common transformed coefficients, an absolute sum of coefficients for the horizontal prediction and an absolute sum of non-zero coefficients for the horizontal prediction.

25. The method as claimed in claim 23 wherein the third sum of absolute transformed differences is obtained by summing an absolute sum of common transformed coefficients, an absolute sum of coefficients for the vertical prediction, an absolute sum of coefficients for the horizontal prediction and an absolute sum of non-zero coefficients for the DC prediction.

26. The method as claimed in claim 23 further comprising reducing calculations by skipping the calculations with coefficients that are zero.

27. The method as claimed in claim 23 wherein the method results in determining a best intra-prediction mode.

28. The method as claimed in claim 23 wherein computations for finding a best intra-prediction mode are reduced to less than 4000.

29. The method as claimed in claim 28 wherein the computations are reduced in a video encoder.

30. The method as claimed in claim 29 wherein the video encoder utilizes H.264 standard protocol.

31. An apparatus for reducing computations in intra-prediction and mode decision processes in video encoding processes, comprising:
  a. a program module for calculating a plurality of absolute sums, calculating a plurality of Hadamard transforms and obtaining one or more sums of absolute transformed differences using the plurality of Hadamard transforms, wherein a first sum of absolute transformed differences is obtained by summing an absolute sum of common transformed coefficients, an absolute sum of coefficients for vertical prediction and an absolute sum of non-zero coefficients for the vertical prediction; and
  b. a processor for executing the program module.

32. The apparatus as claimed in claim 31 wherein the program module avoids computations where one or more coefficients are zero.

33. The apparatus as claimed in claim 31 wherein the computations are reduced to less than 4000.

34. The apparatus as claimed in claim 31 wherein the computations are reduced in a video encoder.

35. The apparatus as claimed in claim 34 wherein the video encoder utilizes H.264 standard protocol.

* * * * *

UNITED STATES PATENT AND TRADEMARK OFFICE
CERTIFICATE OF CORRECTION

| | |
|---|---|
| PATENT NO. | : 7,929,608 B2 |
| APPLICATION NO. | : 11/391801 |
| DATED | : April 19, 2011 |
| INVENTOR(S) | : Rathish Krishnan |

Page 1 of 1

It is certified that error appears in the above-identified patent and that said Letters Patent is hereby corrected as shown below:

Col. 11, line 22, In Claim 1, please add "a second absolute sum of coefficients for prediction and a third absolute sum of non-zero coefficients" after "calculating, in the device, a first absolute sum of common transform coefficient,".

Thus, Claim 1, a., should read:

"calculating, in the device, a first absolute sum of common transform coefficient, a second absolute sum of coefficients for prediction and a third absolute sum of non-zero coefficients"

Col. 12, line 31, In Claim 23, line 4 please replace "calculating, in the devive, a first absolute sum of common transform coefficients", with "obtaining, in the device, a first sum of absolute transformed differences for vertical prediction, wherein the first sum of absolute transformed differences is obtained by summing an absolute sum of common transformed coefficients, an absolute sum of coefficients for the vertical prediction and an absolute sum of non-zero coefficients for the vertical prediction".

Thus, Claim 23, a., should read:

"obtaining, in the device, a first sum of absolute transformed differences for vertical prediction, wherein the first sum of absolute transformed differences is obtained by summing an absolute sum of common transformed coefficients, an absolute sum of coefficients for the vertical prediction and an absolute sum of non-zero coefficients for the vertical prediction"

Signed and Sealed this
Eleventh Day of September, 2012

David J. Kappos
*Director of the United States Patent and Trademark Office*